US008799796B2

(12) United States Patent (10) Patent No.: US 8,799,796 B2
Ehrler et al. (45) Date of Patent: Aug. 5, 2014

(54) SYSTEM AND METHOD FOR GENERATING GRAPHICAL DASHBOARDS WITH DRILL DOWN NAVIGATION

(75) Inventors: Stefan Ehrler, Biblis (DE); Judith Roess, Heidelberg (DE); Kattia Jordan-Philipp, Diehlheim (DE)

(73) Assignee: SAP AG, Walldorf (DE)

( * ) Notice: Subject to any disclaimer, the term of this patent is extended or adjusted under 35 U.S.C. 154(b) by 372 days.

(21) Appl. No.: 12/974,969

(22) Filed: Dec. 21, 2010

(65) Prior Publication Data

US 2012/0159359 A1   Jun. 21, 2012

(51) Int. Cl.
*G06F 3/048* (2013.01)

(52) U.S. Cl.
USPC ........................................................ 715/763

(58) Field of Classification Search
USPC ................................................. 715/763, 764
See application file for complete search history.

(56) References Cited

U.S. PATENT DOCUMENTS

| | | | | |
|---|---|---|---|---|
| 2004/0225955 | A1* | 11/2004 | Ly ................................ | 715/500 |
| 2005/0027790 | A1* | 2/2005 | Dziejma ....................... | 709/200 |
| 2007/0130113 | A1* | 6/2007 | Ting ............................. | 707/2 |
| 2008/0294680 | A1* | 11/2008 | Powell et al. ................ | 707/102 |
| 2009/0319931 | A1* | 12/2009 | Hutchings et al. ............ | 715/771 |
| 2011/0125561 | A1* | 5/2011 | Marcus ....................... | 705/14.15 |
| 2012/0089920 | A1* | 4/2012 | Eick ............................. | 715/739 |

OTHER PUBLICATIONS

What's New in SAP Crystal Dashboard Design, SAP Crystal Dashboard Design Brochure, SAP AG 2010 (an electronic copy was retrieved from the world wide web on Dec. 7, 2010).
SAP Crystal Dashboard Design Software Feature Comparison, SAP Information Sheet, SAP AG 2010 (an electronic copy was retrieved from the world wide web on Dec. 7, 2010).
Interaction Dashboards for Decision Makers, SAP Crystal Dashboard Design Product Brief, SAP AG 2010 (an electronic copy was retrieved from the world wide web on Dec. 7, 2010).

* cited by examiner

*Primary Examiner* — William Bashore
*Assistant Examiner* — Rayeez Chowdhury
(74) *Attorney, Agent, or Firm* — Kenyon & Kenyon LLP

(57) ABSTRACT

A system, machine-readable medium and a method that may provide a dashboard that may be created with menu controls that allow a user to navigate to the underlying data, manipulate the data, and present the manipulated data in the dashboard upon navigation back to the dashboard. The menu controls may include a data link to an address of a data location containing the data presented in the dashboard.

18 Claims, 3 Drawing Sheets

100

200

300

US 8,799,796 B2

SYSTEM AND METHOD FOR GENERATING GRAPHICAL DASHBOARDS WITH DRILL DOWN NAVIGATION

BACKGROUND

The disclosed subject matter relates to a system and method for generating graphical dashboards. In particular, the disclosed subject matter relates to a computerized system and method for generating an interactive platform for the presentation and manipulation of data.

Presentation of data to allow visualization and interpretation of the data is known. Computer data presentation applications, such as Power Point™ provide graphical presentation of data for visualization and interpretation. However, the data presentation applications may present an excessive amount of data, and the data is not always current. In order to insure the currency of the data, frequent updates would be made to the presentation, for example, up to the time of the presentation in some instances. A concept developed that it would be beneficial to provide a more concise amount of data in a single presentation screen that allows for simplified interpretation and monitoring of the data. The single presentation screens became known as dashboards.

Present dashboards are similar to the previous graphical presentation applications in that they are not always presented with real time data, so updates may be frequently required. However, system latencies result in the data updates to be less than real-time, but may take a matter of minutes. In addition, present dashboards do not provide a capability to drill down to underlying data in near, real-time from within the dashboard.

Accordingly, the inventors recognized the need for a presentation application for presenting dashboards that execute data downloads executed from within the dashboard in which data is retrieved from a back end database rapidly, i.e., near real-time.

DETAILED DESCRIPTION

Described embodiments provide a method, system and machine-readable medium for retrieving data from a backend system via links within a dashboard presentation. The described embodiments may provide for selecting, by a processor, a type of dashboard from plurality of dashboard templates. The processor may present the selected dashboard for population with data retrieved from a data location. Data links may be created by the processor to the data location related to the data shown in the dashboard. The data link directs a processor to the data location. In response to a selection of the data link in the dashboard, the processor may navigate to the data location. At the data location, data may be manipulated. The manipulated data may be presented at the data location.

Figure 1:
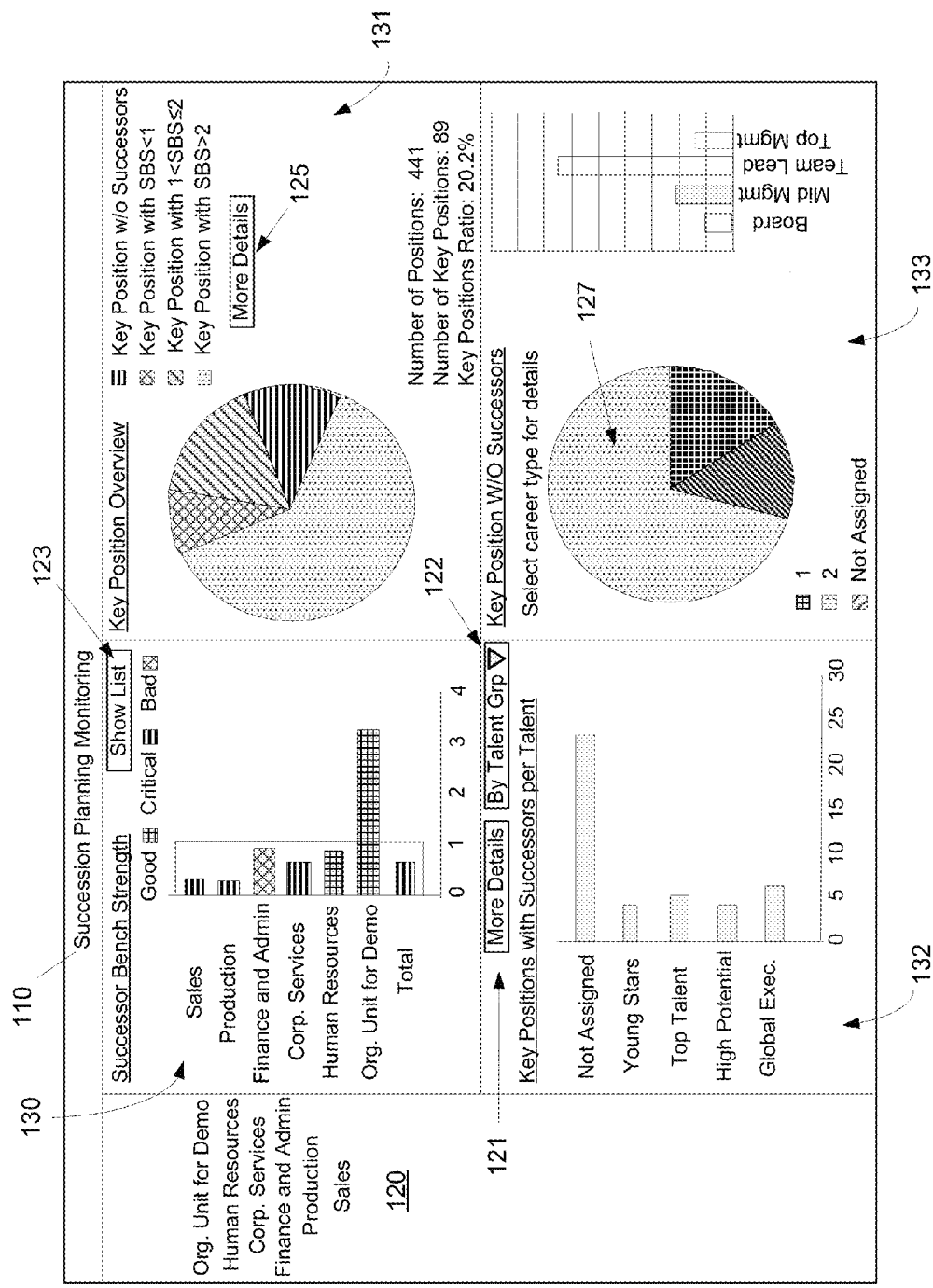
FIG. 1 illustrates a representation of a dashboard according to an embodiment of the present invention.

FIG. 1 illustrates a representation of a dashboard according to an embodiment of the present invention. The exemplary dashboard 100 may be useful, for example, to a human resources manager looking at the talent pool for succession to key positions within an entity, such as a corporation. The dashboard 100 may be a graphical user interface that may include a heading bar 110, a menu bar 120 and data presentation fields 130-133. The heading bar 110 indicates the name of the dashboard template, or can indicate the name of a customized dashboard after the dashboard is generated. The menu bar 120 may provide a list of categories which have detailed data related to the data in the data presentation fields 130-133. Data presentation fields 130-133 may provide a highly visualized and summarized presentation of relevant information related to the categories shown in the menu bar 120. The presented data may allow a view to recognize data outliers in any key performance category at a single glance and offers the viewer the option to drilldown to more detailed information. Each of the data presentation fields 130-133 may provide detailed data related to a respective field. For example, the data presentation field 130 may present data related to employees who can succeed the present leaders in the respective department (i.e., Successor Bench Strength), and may include a control 123 for showing a list of the names of the persons in the respective categories (i.e., Sales, Production, Finance and Administration, and so on). Similarly, data presentation field 131 shows an overview of key positions, and has the control 125 for presenting additional details about the key positions that have successors. As for data presentation field 132, it may have multiple controls 121 and 122 that allow a user to drill down for more details (control 121) regarding each of the respective talent groups (e.g., Not assigned, Young stars, Top Talent) via control 122. Of course, any of the data presentation fields 130-133 may have multiple controls such as controls 121 and 122. Data presentation field 133 may include another type of control 127 that allows a user to select a section of the pie chart to obtain additional details regarding each of the career types (e.g., Board, Middle Management, Team Lead, and Top Management).

Underlying the controls 121-127 in a graphical user interface of the dashboard 100 may be links to the respective data that was used to generate the dashboard. The underlying links may allow for more efficient access to the respective data in each data presentation field 130-133. The respective data may be detailed data that is related to that presented in the respective data presentation fields 130-133 of the dashboard 100. The dashboard 100 and the functionality for drilling down to the respective detailed data for each of the respective data presentation fields 130-133 may be implemented by a system as illustrated in FIG. 2.

Figure 2:
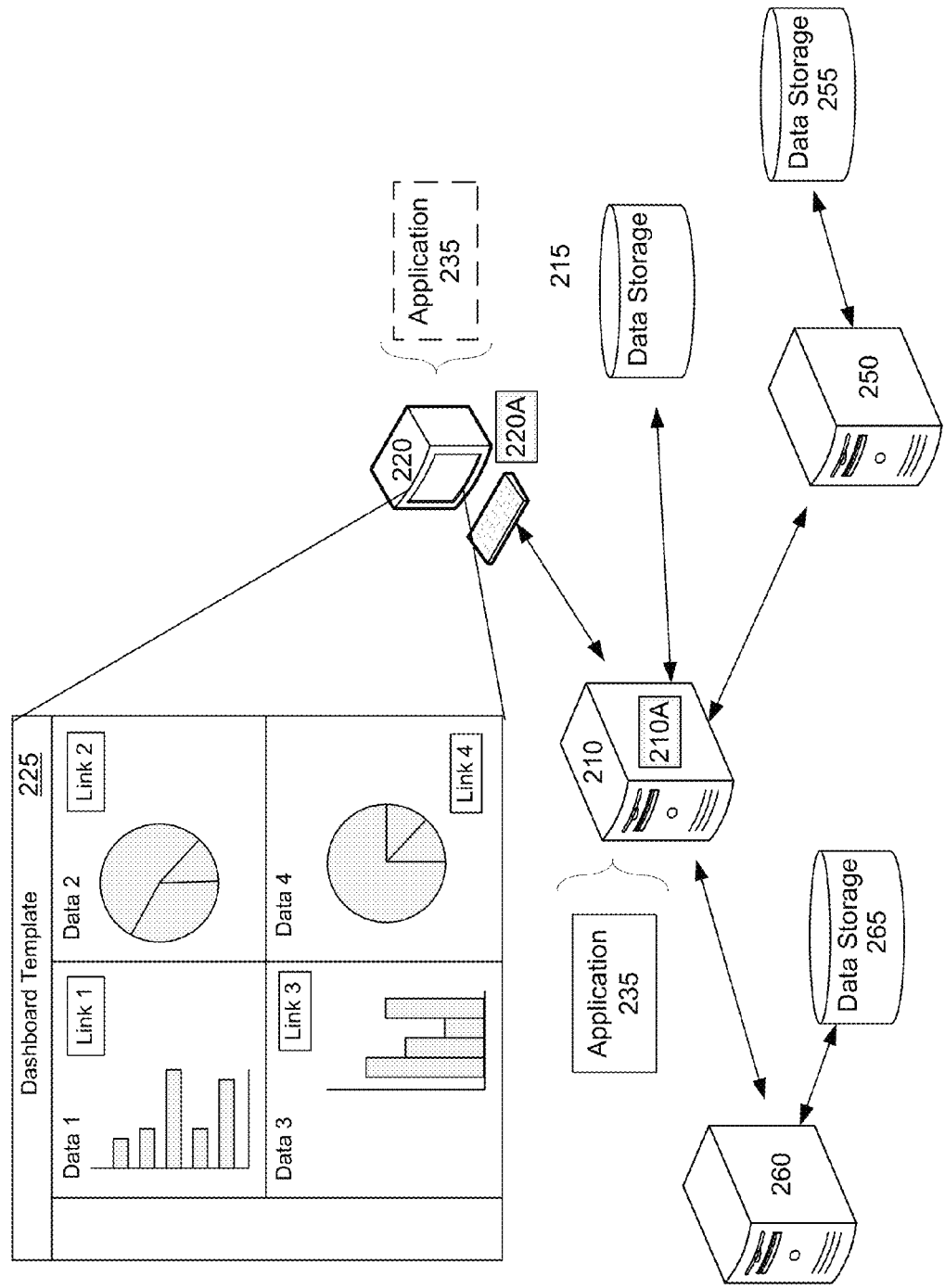
FIG. 2 illustrates a system for implementing a dashboard according to an embodiment of the present invention.

The system 200 of FIG. 2 may include a server 210, a client terminal 220 and data storage 215. The server 210 may include a processor 210A that executes computer program instructions of a computer application 235 that facilitates the generation of a dashboard, such as dashboard 225. The application 235, which may be stored in data storage 215, or in memory on server 210, may also be executed on client terminal 220, which may have a processor and data storage (both not shown) for executing computer program instructions. The generation of the dashboard 225 may be the result of user selection of dashboard template menu items in a graphical user interface presented by the processor 210A executing the computer application 235. Additional servers 250, 260 and respective data storages 255, 265 may be accessed by the server 210 in response to instructions from application 235 to provide data to the dashboard 225. The servers 250 and 260 may also provide processed data (e.g., calculations using the presented data) that may be relevant for the interpretation or analysis of the data. The servers 250 and 260 may be web servers that provide data via the Internet to the server 210. The servers 250, 260 and data storages 255, 265 may also be servers that process and store different data, e.g., financial, operational, facilities data, than server 210 and may be accessed via a local area network, a wide area network or similar networking arrangement.

For example, each of the links Link 1-Link 4 may comprise an address of a location of the data in any one of the data storage devices 215, 255 or 265. For example, the link, in response to the selection of one of the links Link 1-Link 4, may cause a processor, e.g., 210A or 220A, to respond by the dashboard 225 by navigating to data that may be manipulated to reflect changes of the respective displayed data. Of course, each of the links Link 1-Link 4 may link to the same (e.g., if the data address location contains multiple types of data) or different data location addresses. The selection of any of the links Link1-Link 4 may cause the generation of a query that provides data in near, real-time. The queries may include attributes that tailor the query to a specific file, or specific area of a data source, that is relevant to the context of the portion of the dashboard 225 being generated. Alternatively, the query may call a computer application (for example, Excel™) and open a specific file within the application that allows the user to manipulate the data. Advantageously, a user does not have to recall the location of the data and navigate away from a dashboard to obtain additional data related to the data presented in the dashboard, instead the user can navigate directly through (i.e., "drill down") the dashboard to the relevant data.

The computer program instructions of the application 235 cause the processor 210A to present a dashboard template 225 that is presented as a graphical user interface on a display device of the client terminal 220. The dashboard template 225 may be one of many templates from which a user may select. For example, the dashboard 100 in FIG. 1 is directed to "succession planning monitoring", which is one of many different human resources function, but other functions such as accounting, customer relationship management and the like, may have a plurality of dashboard templates for presenting a concise and customized view of related data. After selection of a dashboard template, a user may begin building a dashboard according to an exemplary process as described with respect to FIG. 3.

The display device of client terminal 220 may present a graphical user interface for manipulating data retrieved from the data location address. In addition, the display may present another graphical user interface and data in response to the selection of another link in the dashboard 225. Client terminal 220 may also be a tablet computer, a smartphone, a laptop, a personal digital assistant or the like.

Figure 3:
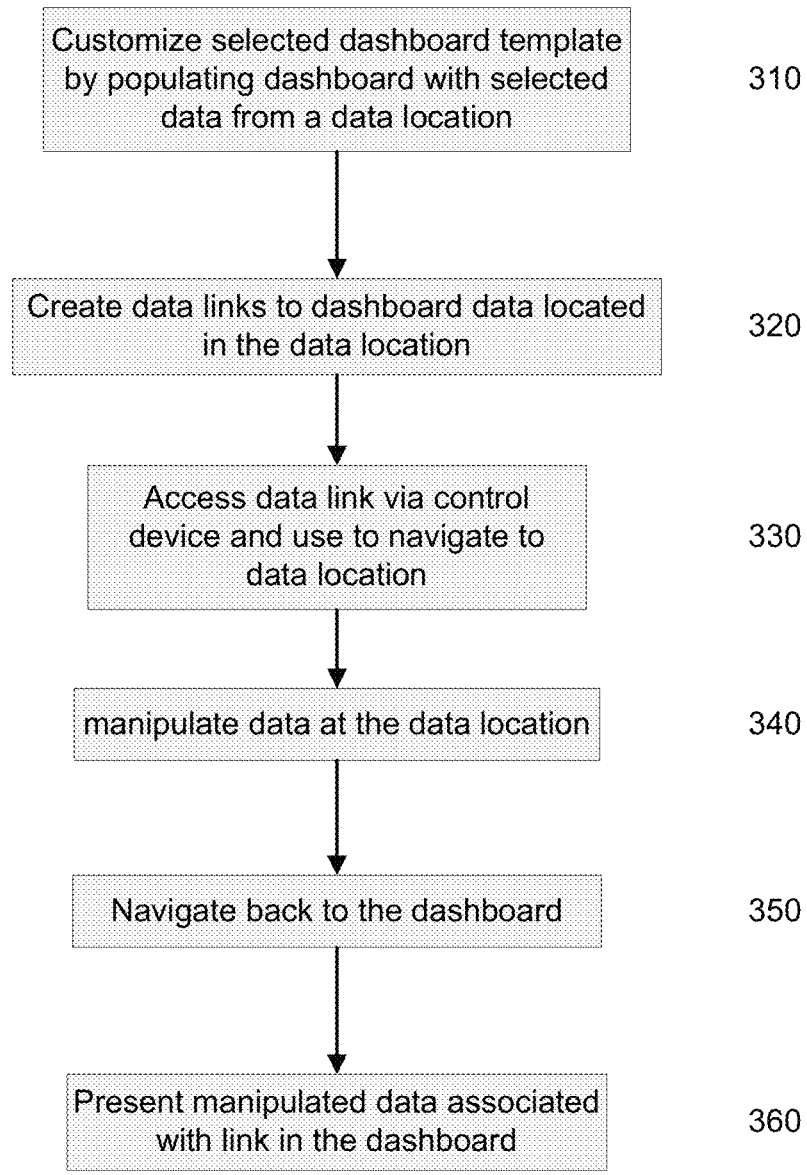
FIG. 3 illustrates an exemplary process for generating a dashboard according to an embodiment of the present invention.

FIG. 3 illustrates an exemplary process for generating a dashboard according to an embodiment of the present invention. A dashboard may be presented on a display device such as that shown with respect to client terminal 220. The process 300 may allow the customize selected dashboard template by populating a dashboard with selected data from a data location (at step 310). The process at 320 may create data links in the dashboard to the data location of data to be used in the dashboard, and populate the data fields of the dashboard (step 330). For example, a processor may automatically create data links upon the selection of data used to populate the data fields in the dashboard, or a user may insert the data location address in a data field. By accessing a data link at 330, for example, in response to a selection of a data link menu control, the dashboard may navigate to data location. In this case for example, a new screen may be generated on a display device that allows the data in the data location to be manipulated (step 340). A user may then navigate back to the dashboard at step 350, where the manipulated data associated with link may be presented in the dashboard (step 360).

The exemplary method and computer program instructions may be embodied on a machine readable storage medium such as a computer disc, optically-readable media, magnetic media, hard drives, RAID storage device, and flash memory. In addition, a server or a database server may include machine readable media configured to store machine executable program instructions. The features of the disclosed embodiments may be implemented in hardware, software, firmware, or a combination thereof and utilized in systems, subsystems, components or subcomponents thereof. When implemented in software, the elements of the disclosed embodiments are programs or the code segments used to perform the necessary tasks. The program or code segments can be stored on machine readable storage media. The "machine readable storage media" may include any medium that can store information. Examples of a machine readable storage medium include electronic circuits, semiconductor memory device, ROM, flash memory, erasable ROM (EROM), floppy diskette, CD-ROM, optical disk, hard disk, fiber optic medium, or any electromagnetic or optical storage device. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the sprit and substantive features of the invention. For example, features and embodiments described above may be combined with and without each other. The present embodiments are therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for creating a custom dashboard with drill down navigation, comprising:
    selecting, by a processor, a type of dashboard from a plurality of dashboard templates;
    presenting, by the processor, the selected dashboard for population with data retrieved from a data location;
    creating data links, by the processor, to the data location related to the data shown in the selected dashboard, wherein the data link directs a processor to the data location;
    in response to a selection of the data link in the selected dashboard:
        generating a query to access the data in near real-time, wherein the generated query, based on the data location, includes one of attributes to query a specific file and attributes to query a specific area of a data source;
        navigating to the data location; and
        opening, by the processor, another screen over the dashboard for displaying data retrieved from the data location;
    in response to user input, manipulating the data at the data location; and presenting the user-manipulated data in the selected dashboard, wherein selection of a user control device causes the processor to provide a menu for selection of a specific data set from a plurality of data sets presented in a specific portion of the dashboard and the data address of the user control device for following the data link corresponds to the specific data set selected from the menu.

2. The method of claim 1, wherein the another screen displaying the data retrieved from the data location includes a graphical user interface for manipulating the data retrieved from the data location.

3. The method of claim 1, wherein the another screen is a graphical user interface of a data processing computer application.

4. The method of claim 1, further comprising:
selecting a different data link within the dashboard; and
navigating to a different data location, wherein the data location is an Internet address.

5. The method of claim 4, wherein the data links are presented as user control devices within the dashboard.

6. A computer system for testing computer application functions, comprising:
a server for providing access to a plurality of data storage devices;
a display device for presenting data;
a processor connected to the server and the display device, the processor configured to:
select a type of dashboard from a plurality of dashboard templates;
present selected dashboard for population with data retrieved from a data location;
create data links to the data location related to the data shown in the selected dashboard, wherein the data link directs a processor to the data location;
in response to a selection of the data link in the selected dashboard:
generate a query to access the data in near real-time, wherein the generated query, based on the data location, includes one of attributes to query a specific file and attributes to query a specific area of a data source;
navigate to the data location; and
open another screen over the dashboard for displaying data retrieved from the data location;
in response to user input, manipulate the data at the data location;
present the user-manipulated data in the selected dashboard; and
in response to the selection of a user control device, provide a menu for selection of a specific data set from a plurality of data sets presented in a specific portion of the dashboard, wherein the data address of the user control device for following the data link corresponds to the specific data set selected from the menu.

7. The computer system of claim 6, wherein the another screen displaying the data retrieved from the data location includes a graphical user interface for manipulating the data retrieved from the data location.

8. The computer system of claim 6, wherein the another screen is a graphical user interface of a data processing computer application.

9. The computer system of claim 6, further comprising:
selecting a different data link within the dashboard; and
navigating to a different data location, wherein the data location is an Internet address.

10. The computer system of claim 9, wherein the data links are presented as user control devices within the dashboard.

11. A machine-readable storage medium embodied with computer program instructions for causing a processor to execute a method for testing computer application functions, the method comprising:
selecting a type of dashboard from a plurality of dashboard templates;
presenting the selected dashboard for population with data retrieved from a data location;
creating data links to the data location related to the data shown in the selected dashboard, wherein the data link directs a processor to the data location;
in response to a selection of the data link in the selected dashboard:
generating a query to access the data in near real-time, wherein the generated query, based on the data location, includes one of attributes to query a specific file and attributes to query a specific area of a data source;
navigating to the data location; and
opening another screen over the dashboard for displaying data retrieved from the data location;
in response to user input, manipulating the data at the data location; and
presenting the user-manipulated data in the selected dashboard,
wherein selection of a user control device causes the processor to provide a menu for selection of a specific data set from a plurality of data sets presented in a specific portion of the dashboard, and the data address of the user control device for following the data link corresponds to the specific data set selected from the menu.

12. The machine-readable storage medium of claim 11, wherein the another screen displaying the data retrieved from the data location includes a graphical user interface for manipulating the data retrieved from the data location.

13. The machine-readable storage medium of claim 11, wherein the another screen is a graphical user interface of a data processing computer application.

14. The machine-readable storage medium of claim 11, further comprising:
selecting a different data link within the dashboard; and
navigating to a different data location, wherein the data location is an Internet address.

15. The machine-readable storage medium of claim 11, wherein the data links are presented as user control devices within the dashboard.

16. The method of claim 1, further comprising:
calling, by the generated query, a computer application associated with the specific file; and
opening the specific file within the application, wherein the user-manipulation of the data is performed through the application.

17. A method for creating custom dashboard with drill down navigation, comprising:
selecting, by a processor, a type of dashboard from a plurality of dashboard templates;
presenting, by the processor, the selected dashboard for population with data retrieved from a data location;
creating data links, by the processor, to the data location related to the data shown in the selected dashboard, wherein the data link directs a processor to the data location;
in response to a selection of the data link in the selected dashboard:
generating a query to access the data in near real-time, wherein the generated query, based on the data location, includes one of attributes to query a specific file and attributes to query a specific area of a data source;

navigating to the data location; and opening, by the processor, another screen over the dashboard for displaying data retrieved from the data location;

in response to user input, manipulating the data at the data location; and presenting the user-manipulated data in the selected dashboard, wherein the data is related to potential successors to present leaders in a plurality of employment departments and the dashboard presents the data as a chart indicating a number of successors per each respective department.

18. The method of claim 17, wherein the dashboard includes a control to view each successor in the each respective department.

* * * * *